United States Patent [19]

Nakamura et al.

[11] Patent Number: 5,380,590
[45] Date of Patent: Jan. 10, 1995

[54] WATER-DISPERSIBLE AROMATIC POLYESTER, AQUEOUS DISPERSION THEREOF AND POLYESTER FILM COATED THEREWITH WHICH PERMITS FAST ADHESION

[75] Inventors: Tomoki Nakamura; Tetsuo Ichihashi, both of Matsuyama; Masayuki Fukuda, Sagamihara, all of Japan

[73] Assignee: Teijin Limited, Osaka, Japan

[21] Appl. No.: 205,725

[22] Filed: Mar. 4, 1994

[51] Int. Cl.$^6$ ............................ D02G 3/00; C08L 67/03
[52] U.S. Cl. ................................ 428/375; 528/176; 528/189; 528/190; 528/194; 528/195; 528/272; 528/295; 528/297; 528/298; 528/302; 528/308; 524/601; 524/603; 524/604; 524/609; 428/357; 428/364; 428/480
[58] Field of Search ............... 528/176, 189, 190, 194, 528/195, 272, 295, 297, 298, 302, 308; 524/601, 603, 604, 609; 428/480, 357, 364, 375

[56] References Cited

U.S. PATENT DOCUMENTS 4,379,039 4/1983 Fujimoto et al. ............... 204/159.15

OTHER PUBLICATIONS

Database WPI Week 9007, Derwent Publications Ltd., London, GB; An 90-049166 & JP-A-2 003 419 (Teijin KK) 9 Jan. 1990.

Chemical Abstracts, vol. 119, No. 20, 15 Nov. 1993, Columbus, Ohio, abstract No. 204955a, Sanenobu, Kazuyuki et al 'Polyester . . . ' & JPA-04 332 756.

Primary Examiner—Samuel A. Acquah
Attorney, Agent, or Firm—Sherman and Shalloway

[57] ABSTRACT

A water-dispersible aromatic polyester comprising a dicarboxylic acid component and a glycol component, wherein (A) at least 95 mol% of the dicarboxylic acid component is composed of an aromatic dicarboxylic acid component containing 30 to 99.5 mol% of a 2,6-naphthalenedicarboxylic acid component and at least 0.005 mol% to less than 5 mol% of an aromatic dicarboxylic acid component having a sulfonic acid salt group, and (B) at least 95 mol% of the glycol component is composed of an ethylene glycol component and a component from a propylene oxide adduct of bisphenol A, the molar ratio of the ethylene glycol component:the component of a propylene oxide adduct of bisphenol A being 40-99:60-1; and a fast-adhesion polyester film comprising a polyester film and a coating which contains the above water-dispersible aromatic polyester and is formed on at least one surface of the polyester film.

13 Claims, No Drawings

WATER-DISPERSIBLE AROMATIC POLYESTER, AQUEOUS DISPERSION THEREOF AND POLYESTER FILM COATED THEREWITH WHICH PERMITS FAST ADHESION

DETAILED DESCRIPTION OF THE INVENTION

The present invention relates to a water-dispersible aromatic polyester, an aqueous dispersion thereof and a polyester film coated with the aromatic polyester which permits fast adhesion (the property of permitting fast adhesion to be referred to as "fast-adhesion" hereinafter). More specifically, it relates to a polyester which can form a fast-adhesion coating (layer) excellent in heat resistance, water resistance and anti-blocking, an aqueous dispersion thereof, and a fast-adhesion polyester film coated therewith and useful for a packaging material, a magnetic card, a magnetic tape, a magnetic disk and a printing material.

A polyester film produced by melt-extruding any one of thermoplastic polyesters such as a homopolymer or copolymer of polyethylene terephthalate and a homopolymer or copolymer of polyethylene naphthalenedicarboxylate, or a blend of any one of these homopolymers or copolymers and a small amount of other resin, biaxially orienting the extrudate and thermoserring the oriented film is excellent in mechanical strength, heat resistance and chemical resistance and is hence used in a variety of industrial fields. However, the problem with this polyester film is that the film surface has too high crystal orientation to exhibit the receptivity to a coating composition, an adhesive or an ink.

For improving the receptivity of the polyester film surface, there is a method in which a primer layer (undercoating) of a synthetic resin is preliminarily formed on the film surface and a thin surface layer different from the base film is formed. The primer layer is formed by applying an organic solvent solution, or a water-based solution (aqueous solution or dispersion), of a synthetic resin to the film surface.

Japanese Laid-open Patent Publication No. 99,947/1980 discloses an aqueous dispersion of a polyester formed from (A) terephthalic acid, (B) 1,4-butanediol or ethylene glycol, (C) dicarboxylic acid and/or a diol copolymer component and (D) an ester-forming sulfonic acid metal salt monomer.

Japanese Laid-open Patent Publication No. 3,419/1990 discloses an aqueous dispersion of a polyester containing a glycol-derived component, 30 to 70 mol% of which is formed from an ethylene oxide adduct of bisphenol A, an ethylene oxide adduct of bisphenol S and/or neopentyl glycol.

Japanese Laid-open Patent Publication No. 132,171/1991 discloses an aqueous dispersion of a polyester containing a glycol-derived component, 0 to 60 mol % of which is formed from an ethylene oxide adduct of bisphenol A.

Japanese Laid-open Patent Publication No. 328,308/1991 discloses a water-soluble or dispersible polyester formed from a polybasic acid-derived component containing at least 5 mol% of phenylindanedicarboxylic acid.

Japanese Laid-open Patent Publication No. 348,941/1992 discloses a fast-adhesion polyester film having a laminated surface layer of a copolyester having Tg of 30° to 130° C. and containing 5-sodiumsulfoisophthalic acid. Example 2 of this Patent Publication discloses a copolyester having a dicarboxylic acid-derived component formed from 87.5 mol% of terephthalic acid and 12.5 mol% of a sodium sulfoisophthalic acid and a diol-derived component formed from 70 mol% of ethylene glycol and 30 mol% of an ethylene oxide adduct of bisphenol S.

Japanese Laid-open Patent Publication No. 86,175/1993 discloses a water-soluble copolyester formed from at least 50 mol% of an aromatic dicarboxylic acid component, an ester-forming sulfonic acid alkali metal salt compound and a glycol component containing 5 to 90 mol% of a 2,2-bis(4-hydroxyphenyl)-propane derivative. Example 4 of the above Patent Publication discloses a water-soluble copolyester having a dicarboxylic acid-derived component formed from 80 mol% of dimethyl terephthalate and 20 mol% of dimethyl 5-sodiumsulfoisophthalate and a glycol-derived component formed from 30 mol% of a propylene oxide adduct of 2,2-bis(4-hydroxyphenyl)propane and 70 mol% of ethylene glycol.

However, the primer layer formed from a water-soluble or water-dispersible solution of any one of the above conventional polyesters is not satisfactory in heat resistance and water resistance. Therefore, there is caused a problem on a film-forming step and on handling of the film as a product particular, the sticking (blocking) of the film at high temperature under high humidity is a problem. For preventing the blocking, it is effective to decrease the coating amount for forming the primer layer. With a decrease in the coating amount, however, the intended fast-adhesion performance decreases.

It is therefore an object of the present invention to provide a novel water-dispersible aromatic polyester.

It is another object of the present invention to provide a water-dispersible aromatic polyester which can form a fast-adhesion coating (primer layer: fast adhesion layer) excellent in heat resistance, water resistance and anti-blocking.

It is further another object of the present invention to provide an aqueous dispersion of the above aromatic polyester.

It is still further another object of the present invention to provide a fast-adhesion polyester film provided with a coating containing the above aromatic polyester film.

Other objects and advantages of the present invention will be apparent from the following description.

According to the present invention, the above objects and advantages of the present invention are achieved, first, by a water-dispersible aromatic polyester comprising a dicarboxylic acid component and a glycol component, wherein:

(A) at least 95 mol% of the dicarboxylic acid component is composed of an aromatic dicarboxylic acid component containing 30 to 99.5 mol% of a 2,6-naphthalenedicarboxylic acid component and at least 0.005 mol% to less than 5 mol% of an aromatic dicarboxylic acid component having a sulfonic acid salt group, and (B) at least 95 mol% of the glycol component is composed of an ethylene glycol component and a component from a propylene oxide adduct of bisphenol A, the molar ratio of the ethylene glycol component:the component of a propylene oxide adduct of bisphenol A being 40-99:60-1.

In the water-dispersible aromatic copolyester of the present invention, at least 95 mol%, preferably at least 98 mol%, particularly preferably nearly all, of the dicarboxylic acid component is composed of an aromatic dicarboxylic acid component.

Up to 5 mol%, preferably up to 2 mol%, of the dicarboxylic acid component can be formed from a dicarboxylic acid other than the aromatic dicarboxylic acid. This dicarboxylic acid other than the aromatic dicarboxylic acid can be selected from aliphatic dicarboxylic acids such as adipic acid and sebaccic acid.

Further, the aromatic dicarboxylic acid component contains 30 to 99.5 mol%, preferably 35 to 99 mol%, of a 2,6-naphthalenedicarboxylic acid component and 0.005 (inclusive) to 5 (exclusive) mol% of an aromatic dicarboxylic acid component having a sulfonic acid salt group.

When the content of the 2,6-naphthalenedicarboxylic acid component is less than 30 mol%, undesirably, a film having a coating of the copolyester shows inferior anti-blocking properties. When it exceeds 99.5 mol%, it is difficult to dissolve the copolyester in a hydrophilic organic solvent at a step for preparing an aqueous dispersion to be described later. Further, when the content of the aromatic dicarboxylic acid component having a sulfonic acid salt group is less than 0.005 mol%, undesirably, the copolyester shows decreased hydrophilic nature and it is hence difficult to form an aqueous dispersion. When it is more than 5 mol%, undesirably, a film having a coating of the copolyester shows decreased antiblocking properties.

The aromatic dicarboxylic acid component having a sulfonic acid salt group preferably includes 5-sodiumsulfoisophthalate, 5-potassiumsulfoisophthalate, 5-lithiumsulfoisophthalate and 5-phosphoniumsulfoisophthalate. Of these, 5-sodiumsulfoisophthalate and 5-lithiumsulfoisophthalate are more preferred, and 5-lithiumsulfoisophthalate is particularly preferred.

The aromatic dicarboxylic acid component may further contain 65 mol% or less, more preferably 60 mol% or less, of an aromatic dicarboxylic acid component other than the 2,6-naphthalenedicarboxylic acid component and the aromatic dicarboxylic acid component having a sulfonic acid salt group. The above "other" aromatic dicarboxylic acid component is formed, for example, from terephthalic acid, isophthalic acid, phthalic acid or biphenyldicarboxylic acid. Of these, isophthalic acid is particularly preferred.

Further, at least 95 mol%, preferably at least 98 mol%, more preferably nearly all, of the glycol component forming the water-dispersible aromatic polyester is composed of an ethylene glycol component and a component from a propylene oxide adduct of bisphenol A. The molar ratio of the ethylene glycol component:the component from a propylene oxide adduct of bisphenol A is 40-99:60-1, preferably 60-90:40-10.

A glycol component other than the ethylene glycol component and the component from a propylene oxide adduct of bisphenol A may be contained in an amount of up to 5 mol%, preferably up to 2 mol%. The above "other" glycol component is preferably formed from 1,4-butanediol or 1,4-cyclohexanedimethanol.

When the molar ratio of the ethylene glycol component:the component from a propylene oxide adduct of bisphenol A is smaller than 40:60, undesirably, a film having a coating of the copolyester shows a decline in anti-blocking properties.

The propylene oxide adduct of bisphenol A is represented, for example, by the following formula.

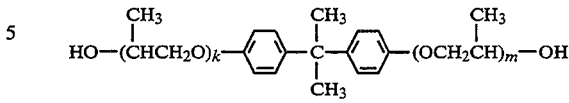

wherein each of k and m is independently an integer of 1 to 9, and, preferably, k+m is 2 to 10.

When k+m is too large, the copolymer shows decreased anti-blocking properties. The sum of k+m is therefore preferably small, and k+m=2 is the most preferred.

The copolyester of the present invention preferably has an intrinsic viscosity, measured in o-chlorophenol at 35° C., of 0.2 to 0.8.

The copolyester of the present invention can be produced by a conventional production method. For example, a copolyester having a desired intrinsic viscosity can be produced by a method in which 2,6-naphthalenedicarboxylic acid or an ester-forming derivative thereof, isophthalic acid or an ester-forming derivative thereof and 5-sulfonatesiophthalic acid or an ester-forming derivative thereof are allowed to react with ethylene glycol and a propylene oxide adduct of bisphenol A to form a monomer or oligomer and then the monomer or oligomer is subjected to polycondensation under vacuum. The above reaction and the above polycondensation may be carried out in the presence of an esterifying catalyst or ester interchange catalyst and a polycondensation catalyst. Further, various additives such as stabilizer may be added.

The copolyester of the present invention is dispersible in water, and easily gives an aqueous dispersion. The aqueous dispersion is prepared, for example, as follows.

First, the copolyester is dissolved in a hydrophilic organic solvent which has a solubility of at least 20 g in 1 liter of water at 20° C. and which has a boiling point of 100° C. or lower and causes azeotropy with water at 100° C. or lower. This organic solvent is selected from dioxane, acetone, tetrahydrofuran and methyl ethyl ketone. A small amount of a surfactant may be further added to the solution.

Then, water is added to the above solution of the copolyester dissolved in the organic solvent with stirring, preferably while the solution is stirred at a high rate under heat, thereby to form a bluish white or milky white dispersion. Alternatively, the above solution of the copolyester dissolved in the organic solvent may be added to water while the water is stirred, whereby a bluish white or milky white dispersion can be obtained.

The above-obtained dispersion is distilled under atmospheric pressure or under reduced pressure to distill off the hydrophtlic organic solvent, whereby the intended aqueous dispersion of the polyester can be obtained. When the copolyester is dissolved in the hydrophilic organic solvent which causes azeotropy with water, water is azeotropically distilled off when the organic solvent is distilled off. It is therefore preferable to use a larger amount of water in advance in order to compensate the loss of water (distilled off azeotropically). Moreover, when the solid concentration after the distillation exceeds 40% by weight, fine particles of the copolyester dispersed in water are liable to form secondary aggregates, and the stability of the aqueous dispersion decreases. It is therefore preferable to set the solid concentration at 40% by weight or lower. On the other hand, there is no special limitation to be imposed on the lower limit of the solid concentration. When, however, the solid concentration is low, it takes a longer time to dry the applied dispersion. The lower limit of the solid concentration is hence preferably at least 0.1% by weight. The solid concentration is particularly preferably 1 to 20% by weight.

The average particle diameter of the above fine particles of the copolyester is generally 1 $\mu$m or less, more preferably 0.8 $\mu$m or less.

The so-obtained aqueous dispersion of the copolyester is applied to one surface or both surfaces of a polyester film to be described later, and dried, whereby the film can be imparted with fast-adhesion properties.

According to the present invention, there is therefore provided a fast-adhesion polyester film comprising a polyester film and a coating which contains the water-dispersible aromatic polyester of the present invention and is formed on at least one surface of the polyester film. The above coating, as a dry coating, preferably has a thickness of 5 to 1,000 nm.

A suitable amount of a surfactant such as an anionic surfactant or a nonionic surfactant may be incorporated into the aqueous dispersion of the polyester when applied. It is effective to use a surfactant which can decrease the surface tension of the polyester to 40 dyne/cm or less and promote the wettability thereof to a polyester film. Various surfactants may be used as such. Examples of the surfactant include polyoxyethylene alkylphenyl ether, polyoxyethylene fatty acid ester, sorbitan fatty acid ester, glycerin fatty acid ester, fatty acid metal soap, alkyl sulfate, alkyl sulfonate, alkyl sulfosuccinate, quaternary ammonium chloride, alkylamine hydrochloride and sodium dodecylbenzenesulfonate.

The aqueous dispersion of the polyester may contain an antistatic agent, a filler, an ultraviolet absorbent, a lubricant and a colorant as required.

The polyester film used as a base film in the present invention is selected from a polyethylene terephthalate film, a polyethylene-2,6-naphthalenedicarboxylate film, a polybutylene terephthalate film and a film formed of a copolymer obtained from any one of these homopolymers and other comonomer. The polyester film may be any one of an unstretched film, a monoaxially stretched film and a biaxially stretched film. Stretched films are preferred.

The aqueous dispersion of the polyester may be applied to the polyester at any step as required. For example, the aqueous dispersion of the polyester is applied to an unstretched or a monoaxially stretched film and dried under heat, and then the film is further stretched, or it is applied to a biaxially stretched film and then dried. The aqueous dispersion of the polyester is preferably applied to a monoaxially stretched film.

The aqueous dispersion of the polyester may be applied to the polyester film according to a conventional method such as a kiss-roll coating method, a reverse-roll coating method, a gravure coating method or a die coating method. The final (dry) layer thickness of a coating formed from the aqueous dispersion of the polyester is preferably 0.01 to 5 $\mu$m more preferably 0.01 to 2 $\mu$m, the most preferably 0.01 to 0.3 $\mu$m.

The so-obtained fast-adhesion polyester film has high adhesion strength and is excellent in heat resistance, water resistance and anti-blocking. It is therefore suitable for a magnetic card, a magnetic tape, a magnetic disk, a printing material, a graphic material and a photosensitive material.

The present invention will be detailed hereinafter with reference to Examples, in which "part" stands for "part by weight". The property values described in Examples were determined as follows.

(1) Adhesion

The following magnetic coating composition was applied to a primer coating of a polyester film under predetermined conditions, and a Scotch tape No. 600 (supplied by 3-M Co.) having a width of 19.4 mm and a length of 8 cm was attached in such a manner that no air bubbles were entrapped. The surface was smoothened with the same manual load roller as that described in JIS C2701 (1975), and the sample was subjected to a peeling test in its laminated portion having a length of 5 cm with a Tension UM-11 supplied by Toyo Baldwin at a head velocity of 300 mm/minute, to measure the peel strength. The measurement value was divided by the tape width to determine the adhesion in terms of g/cm. In the T-peeling test, the sample was drawn while laminate was set with the tape side downward at an inter-chuck distance of 5 cm.

[Preparation of magnetic coating composition for evaluation]

Nitrocellulose RS½ (flakes containing 25% of isopropanol, supplied by Daicel Chemical Industries, Ltd.) was dissolved in a lacquer diluent used for a coating composition, to prepare a 40 wt.% solution. 43.9 Parts of this solution was charged into a ball mill, and then 32.5 parts of a polyester resin (Desmophen #1700, supplied by Bayer AG), 26.0 parts of a chromium dioxide magnetic powder, 1 part of soybean oil fatty acid (Lecion P, supplied by Riken Vitamin K.K.) as a dispersant-wetting agent, 0.5 part of a cationic surfactant (Cation AB, supplied by Nippon Oils and Fats Co., Ltd.) as a dispersant-wetting agent and 0.8 part of squalene (shark liver oil) as a dispersant-wetting agent were charged into the ball mill. Further, 282 parts of a methyl ethyl ketone/cyclohexanone/toluene (=3/4/3 (weight ratio)) mixed solution was added. The mixture was fully finely powdered to prepare a mother liquor coating composition (solid content 45 wt%). 50 Parts of this mother liquor, 48 parts of an addition reaction product from trimethylolpropane and tolylenediisocyanate (Coronate L, supplied by Nippon Polyurethane Kogyo K.K.) and 6.25 parts of butyl acetate were mixed to give a magnetic coating composition having a solid content of 42.7% by weight.

(2) Anti-blocking

Two films were stacked such that the treated surface of one film was placed on the untreated surface of another film, and a pressure of 6 kg/cm² was applied on to the stacked films under atmosphere of a temperature of 60° C. and a relative humidity of 60% for hours. Then, the two films are peeled from each other. The anti-blocking was evaluated on the basis of peel strength (g/5 cm).

(3) Surface State

A metal was vapor-deposited on the coated surfaces of biaxially oriented primer-coated polyester films obtained under conditions shown in Examples, and the metal-deposited surfaces were observed for surface configurations through a scanning electron microscope (S-2150, supplied by Hitachi Ltd.) at a magnification of 10,000 diameters. A surface on which a continuous metal surface layer was formed was taken as excellent.

EXAMPLE 1

<Preparation of copolyester>

100 Parts of dimethyl 2,6-naphthalenedicarboxylate, 2.5 parts of 5-sodium sulfoisophthalate, 44 parts of ethylene glycol and 43 parts of an adduct of bisphenol A with 2 mol of propylene oxide were charged into an ester exchange reactor, and 0.05 part of tetrabutoxytitanium was added. The ester interchange reaction was carried out by heating the mixture, while controlling the temperature at 230° C. in an atmosphere of nitrogen and distilling of methanol formed.

Then, 0.6 part of Irganox 1010 (supplied by Ciba Geigy) was added to the above reaction system. The temperature in the reaction system was gradually increased up to 255° C., and the pressure within the system was decreased to 1 mmHg, to carry out a polycondensation reaction, whereby a copolyester having an intrinsic viscosity of 0.50 was obtained. Table 1 shows the composition of the so-obtained copolyester.

<Preparation of aqueous dispersion of polyester>

20 Parts of the above-obtained copolyester was dissolved in 80 parts of tetrahydrofuran, and 180 parts of water was added to the resultant solution with stirring at a high rate of 10,000 revolution/minute to give a bluish milky-white dispersion. The dispersion was distilled at a reduced pressure of 20 mmHg to distill off tetrahydrofuran. As a result, an aqueous dispersion of polyester, having a solid content of 10% by weight, was obtained.

Further, 2 parts of a nonionic surfactant: polyoxyethylene nonylphenyl ether (HLB=12.8) was added to the above aqueous dispersion of polyester, and 618 parts of water was further added to give a coating liquid.

<Preparation of fast-adhesion polyester film>

Polyethylene terephthalate having an intrinsic viscosity, measured in o-chlorophenol at 35° C., of 0.65 was melt-extruded to obtain an unstretched film having a thickness of 158 μm. The unstretched film was stretched 3.5 times in the machine direction, and then the above coating liquid was applied to one surface of the monoaxially stretched film. The film was stretched 3.9 times in the transverse direction at 105° C. and thermoset at 200° C. for 4.2 seconds to give a biaxially oriented, primercoated polyester film having an average coating weight of 20 mg/m² and a thickness of 12.2 μm. The so-obtained film was measured for adhesion on the treated surface, anti-blocking properties and surface state. Table 1 shows the results.

EXAMPLES 2-4

Copolyesters having compositions shown in Table 1 were prepared in the same manner as in Example 1 except that the components for copolyester and their amounts were changed as shown in Table 1. Then, aqueous dispersions of polyester and further coating liquids were prepared in the same manner as in Example 1 except that the copolyester was replaced with the above-obtained copolyesters.

Further, biaxially oriented, primer-coated polyester films were obtained in the same manner as in Example 1 except that the coating liquid was replaced with the above-prepared coating liquids. The so-obtained films were measured for adhesion on the treated surface, anti-blocking properties and surface state. Table 1 shows the results.

COMPARATIVE EXAMPLE 1

A biaxially oriented primer-coated polyester film was obtained in the same manner as in Example 3 except that the amounts of 5-sodium sulfoisophthalic acid and dimethyl isophthalate were respectively changed to 8 mol% and 32 mol%. The so-obtained film showed poor anti-blocking properties and was improper for practical use.

COMPARATIVE EXAMPLE 2

A biaxially oriented primer-coated polyester film was obtained in the same manner as in Example 1 except that the dimethyl 2,6-naphthalenedicarboxylate was changed to dimethyl terephthalate, that the adduct of bisphenol A with 2 mols of propylene oxide was changed to an adduct of bisphenol A with 4 mols of ethylene oxide and that the amount of 5-sodium sulfoisophthalic acid was changed to 12.5 mol%. The so-obtained film showed deteriorated anti-blocking properties and the film surface underwent cracking in streaks. It was hence improper for practical use.

TABLE 1

| | Composition of copolyester | | | | | | Film properties | | |
|---|---|---|---|---|---|---|---|---|---|
| | Acid component (mol %) | | | | Glycol component (mol %) | | Intrinsic viscosity of copolyester | Adhesion by coat-composition | Anti-blocking property | Surface state |
| | NDA *1 | IPA *2 | NSIPA *3 | LSIPA *4 | EG *5 | BPA-P *6 | | | | |
| Ex. 1 | 98 | — | 2 | — | 70 | 30 | 0.50 | A | 4 | excellent |
| Ex. 2 | 80 | 19.5 | — | 0.5 | 70 | 30 | 0.62 | A | 4 | " |
| Ex. 3 | 60 | 38 | 2 | — | 70 | 30 | 0.60 | A | 4 | " |
| Ex. 4 | 40 | 58 | 2 | — | 70 | 30 | 0.52 | A | 4 | " |
| CEx. 1 | 60 | 32 | 8 | — | 70 | 30 | 0.58 | A | 32 | " |
| CEx. 2 | TA *7 87.5 | — | 12.5 | — | 70 | BPA-E *8 30 | 0.52 | A | 8 | cracking in streaks |

*1: 2,6-naphthalenedicarboxylic acid,
*2: isophthalic acid,
*3: 5-sodium sulfoisophthalate,
*4: 5-lithium isophthalate,
*5: ethylene glycol,
*6: adduct of bisphenol A with 2 mol of propylene oxide,
*7: terephthalic acid,
*8: adduct of bisphenol A with 4 mol of ethylene oxide,
*9: adhesion by magnetic coating composition (A: 90 g/cm or more, X: less than 90 g/cm)

What is claimed is:

1. A water-dispersible aromatic polyester comprising a dicarboxylic acid component and a glycol component, wherein:
   (A) at least 95 mol% of the dicarboxylic acid component is composed of an aromatic dicarboxylic acid component containing 30 to 99.5 mol% of a 2,6-naphthalenedicarboxylic acid component and at least 0.005 mol% to less than 5 mol% of an aromatic dicarboxylic acid component having a sulfonic acid salt group, and
   (B) at least 95 mol% of the glycol component is composed of an ethylene glycol component and a component from a propylene oxide adduct of bisphenol A, the molar ratio of the ethylene glycol component:the component of a propylene oxide adduct of bisphenol A being 40-99:60-1.

2. The water-dispersible aromatic polyester of claim 1, wherein at least 98 mol% of the dicarboxylic acid component is composed of an aromatic dicarboxylic acid component.

3. The water-dispersible aromatic polyester of claim 1, wherein the aromatic dicarboxylic acid component contains 35 to 99 mol% of a 2,6-naphthalenedicarboxylic acid component.

4. The water-dispersible aromatic polyester of claim 1, wherein the aromatic dicarboxylic acid component contains 65 mol% or less of other aromatic dicarboxylic acid component.

5. The water-dispersible aromatic polyester of claim 1, wherein the aromatic dicarboxylic acid component contains other aromatic dicarboxylic acid component which is an isophthalate component.

6. The water-dispersible aromatic polyester of claim 1, wherein at least 98 mol% of the glycol component is composed of an ethylene glycol component and a component from a propylene oxide adduct of bisphenol A.

7. The water-dispersible aromatic polyester of claim 1, wherein the molar ratio of the ethylene glycol component:the component from a propylene oxide adduct of bisphenol A is 60-90:40-10.

8. An aqueous disperson of aromatic polyester, prepared by homogeneously dispersing in an aqueous medium fine particles of a water-dispersible aromatic polyester comprising a dicarboxylic acid component and a glycol component, wherein:
   (A) at least 95 mol% of the dicarboxylic acid component is composed of an aromatic dicarboxylic acid component containing 30 to 99.5 mol% of a 2,6-naphthalenedicarboxylic acid component and at least 0.005 mol% to less than 5 mol% of an aromatic dicarboxylic acid component having a sulfonic acid salt and
   (B) at least 95 mol% of the glycol component is composed of an ethylene glycol component and a component from a propylene oxide adduct of bisphenol A, the molar ratio of the ethylene glycol component:the component of a propylene oxide of bisphenol A being 40-99:60-1.

9. A fast-adhesion polyester film comprising a polyester film and a coating which contains a water-dispersible aromatic polyester formed on at least one surface of the polyester film,
   wherein said coating is prepared by homogenously dispersing in an aqueous medium fine particles of a water-dispersible aromatic polyester comprising a dicarboxylic acid component glycol component, wherein:
   (A) at least 95 mol% of the dicarboxylic acid component is composed of an aromatic dicarboxylic acid component containing 30 to 99.5 mol% of a 2,6-naphthalenedicarboxylic acid component and at least 0.005 mol% to less than 5 mol% of an aromatic dicarboxylic acid component having a sulfonic acid salt group, and
   (B) at least 95 mol% of the glycol component is composed of an ethylene glycol component and a component from a propylene oxide adduct of bisphenol A, the molar ratio of the ethylene glycol component:the component of a propylene oxide adduct of bisphenol A being 40-99:60-1.

10. The fast-adhesion polyester film of claim 9, wherein the coating has a thickness of 5 to 1,000 nm.

11. The water-dispersible aromatic polyester of claim 8, wherein the molar ratio of the ethylene glycol component:the component from a propylene oxide adduct of bisphenol A is 60-90:40-10.

12. The fast-adhesion properties of claim 9 wherein the water-dispersible aromatic polyester has a molar ratio of the ethylene glycol component:the component from a propylene oxide adduct of bisphenol A is 60-90:40-10.

13. The fast-adhesion polyester film of claim 9 wherein the coating has a thickness of 0.01 to 2 $\mu$m.

* * * * *